US008941777B1

(12) United States Patent
Ratner (10) Patent No.: US 8,941,777 B1
(45) Date of Patent: Jan. 27, 2015

(54) SYSTEM AND METHOD FOR CAPTURING IMAGES OF A GEOGRAPHIC AREA

(71) Applicant: Google Inc., Mountain View, CA (US)

(72) Inventor: Daniel Ratner, San Francisco, CA (US)

(73) Assignee: Google Inc., Mountain View, CA (US)

( * ) Notice: Subject to any disclaimer, the term of this patent is extended or adjusted under 35 U.S.C. 154(b) by 239 days.

(21) Appl. No.: 13/664,508

(22) Filed: Oct. 31, 2012

(51) Int. Cl.
*H04N 5/225* (2006.01)
*G03B 17/00* (2006.01)

(52) U.S. Cl.
USPC .......................................... 348/376; 396/420

(58) Field of Classification Search
CPC ... H04N 5/2251; H04N 5/2252; F16M 13/04; G04B 17/561
USPC ........... 348/373–376; 396/419–420, 535–543
See application file for complete search history.

(56) References Cited

U.S. PATENT DOCUMENTS

| 4,037,763 | A | * | 7/1977 | Turchen | 224/153 |
| 4,083,480 | A | * | 4/1978 | Lee et al. | 224/185 |
| 4,206,983 | A | * | 6/1980 | Nettman et al. | 352/243 |
| 4,967,282 | A | * | 10/1990 | Malavasi | 348/376 |
| 4,976,387 | A | * | 12/1990 | Spianti | 224/262 |
| 5,065,249 | A | * | 11/1991 | Horn et al. | 348/376 |
| 5,161,722 | A |   | 11/1992 | Hembree | |
| 5,497,922 | A | * | 3/1996 | Tate | 224/647 |
| D404,910 | S |   | 2/1999 | Schober | |
| 6,336,576 | B1 |   | 1/2002 | Easter | |
| 6,402,003 | B1 |   | 6/2002 | Jackson | |
| 6,843,012 | B1 | * | 1/2005 | Dodd | 40/586 |
| 6,932,256 | B2 |   | 8/2005 | Hale et al. | |
| 6,956,614 | B1 | * | 10/2005 | Quintana et al. | 348/373 |
| 8,028,880 | B2 | * | 10/2011 | Knowles | 224/637 |
| 8,172,117 | B2 |   | 5/2012 | Maggi | |
| 8,328,359 | B2 | * | 12/2012 | Monroe et al. | 352/243 |
| 8,657,507 | B2 | * | 2/2014 | Di Leo | 396/420 |
| 2002/0166241 | A1 | * | 11/2002 | Helinski | 30/296.1 |
| 2006/0289590 | A1 | * | 12/2006 | Held | 224/637 |
| 2007/0031143 | A1 | * | 2/2007 | Riccardi | 396/420 |
| 2009/0201361 | A1 | * | 8/2009 | Lyon et al. | 348/36 |
| 2012/0287336 | A1 | * | 11/2012 | Jensen | 348/376 |

OTHER PUBLICATIONS

Immersive Media Dodeca 2360 camera system and backpack platform, Jan. 19, 2010, retrived from https://web.archive.org/web/20100119064801/http://www.immersivemedia.com/products/capture.html and https://web.archive.org/web/20100214201056/http://www.immersivemedia.com/products/IMC_Dodeca_2360.pdf on Aug. 25, 2014.*

(Continued)

*Primary Examiner* — Timothy J Henn
(74) *Attorney, Agent, or Firm* — Dority & Manning, P.A.

(57) ABSTRACT

A system for capturing images while a user is traversing a geographic area is disclosed. The system may include a frame configured to extend across a first shoulder and a second shoulder of the user and along at least a portion of a back side and a front side of the user. The system may also include a camera coupled to the frame on the back side or the front side of the user. The camera may be configured to capture at least one image of the geographic area. Additionally, the system may include a stabilizing device coupled to the frame on the other of the back side or the front side of the user. The stabilizing device may be configured to counterbalance an amount of weight supported by the frame on the opposed side of the user such that the frame is balanced across the shoulders of the user.

13 Claims, 4 Drawing Sheets

(56) References Cited

OTHER PUBLICATIONS

"DIY kit is taking the Google Street View cam to the streets" Jun. 8, 2012, retrieved from http://www.digitaltrends.com/cool-tech/diy-kit-is-taking-the-google-street-view-cam-to-the-streets/#!bJFgfS on Aug. 25, 2014.*

"360 Degree Interactive Music Video—Watch This!" Nov. 10, 2010, retrieved from http://www.3dfocus.co.uk/3d-news-2/360-degree-music-video/762 on Aug. 25, 2014.*

Anguelov et al., "Google Street View: Capturing the World at Street Level", Published by the IEEE Computer Society, Computer, vol. 43, No. 6, Jun. 2010, pp. 32-38.

* cited by examiner

SYSTEM AND METHOD FOR CAPTURING IMAGES OF A GEOGRAPHIC AREA

FIELD

The present subject matter relates generally to a system and method for capturing images of a geographic area and, more particularly, to a system and method for capturing images while a user is traversing the geographic area.

BACKGROUND

Certain Geographic Information Systems (GIS), such as Google Maps, provide street or sight level images of geographic locations. These images, known on Google Maps as "Street View," are typically 360 degree panoramas that allow a user to view a specific geographic location from a street level perspective (e.g., a person walking on the street at the geographic location) as compared to a top-down map perspective. To create such panoramas, a camera rosette including a plurality of outwardly facing cameras is typically mounted on top of a vehicle to permit multiple simultaneous images to be captured of a specific geographic location (with each camera capturing an image of the location from a different perspective) as the vehicle passes by such location on the street. These images may then be stitched together to create a continuous panoramic image of the geographic location.

However, in providing such street or sight level views, problems have been encountered with capturing images of geographic areas that are incapable of being traversed by a vehicle. For example, travel through mountainous and/or wooded areas is often limited to walking or hiking. In these instances, attempts have been made to support the camera rosette and other equipment on a backpack that can be worn by a user as he/she traverses such geographical areas. However, current backpack designs require that all of the equipment be mounted on the back side of the user. Unfortunately, such backpack designs are "back-side heavy" and, thus, can be uncomfortable for the user to wear for an extended period of time. Moreover, when the user is walking on sloped surfaces (e.g., in mountainous areas) the "back-side heavy" designs require the user to expend additional effort and energy in order to maintain his/her balance.

SUMMARY

Aspects and advantages of the invention will be set forth in part in the following description, or may be obvious from the description, or may be learned through practice of the invention.

In one aspect, the present subject matter is directed to a system for capturing images while a user is traversing a geographic area. The system may include a frame configured to extend across a first shoulder and a second shoulder of the user and along at least a portion of a back side and a front side of the user. The system may also include a camera coupled to the frame on one of the back side or the front side of the user. The camera may be configured to capture at least one image of the geographic area. Additionally, the system may include a stabilizing device coupled to the frame on the other of the back side or the front side of the user. The stabilizing device may be configured to counterbalance an amount of weight supported by the frame on the opposed side of the user such that the frame is balanced across the first and second shoulders of the user.

In another aspect, the present subject matter is directed to a system for capturing images while a user is traversing a geographic area. The system may include a camera configured to capture at least one image of the geographic area and a frame configured to support the camera. The frame may include a first frame member extending lengthwise between a forward end and an aft end. The first frame member may include a front section extending generally upward from the forward end, a middle section extending generally horizontally from the front section and a back section extending generally upward from the middle section towards the aft end. Additionally, the frame may include a second frame member extending lengthwise between a forward end and an aft end. The second frame member may include a front section extending generally upward from the forward end, a middle section extending generally horizontally from the front section and a back section extending generally upward from the middle section towards the aft end. The camera may be coupled to a portion of one of the front sections of the first and second frame members or the back sections of the first and second frame members.

In a further aspect, the present subject matter is directed to a method for capturing images while a user is traversing a geographic area. The method may include positioning a frame on the user. The frame may be configured to extend across a first shoulder and a second shoulder of the user and along at least a portion of a back side and a front side of the user. A camera may be coupled to the frame on one of the backside or the front side of the user. In addition, the method may include stabilizing the frame across the first and second shoulders of the user by balancing an amount of weight supported by the frame on the front side of the user with an amount of weight supported by the frame on the back side of the user and capturing at least one image with the camera as the user traverses the geographic area.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for capturing images of a geographic area. In particular, the present subject matter discloses a system and method for capturing images while a user walks or otherwise traverses across a geographic area. For example, in several embodiments, the disclosed system may include a frame worn by the user that is configured to support a camera and various other equipment configured for capturing and/or processing images. The frame may be configured to extend across the user's shoulders and along a front side and a back side of the user such that the camera and other equipment may be mounted on both sides of the user. As such, the amount of weight mounted along each side of the user may be selected such that the load applied on the user by the frame may be centered on the user's shoulders. Accordingly, the user may comfortably carry the camera/equipment while traversing a geographic area (e.g., a mountainous or wooded area) while easily maintaining his/her balance.

Figure 1:
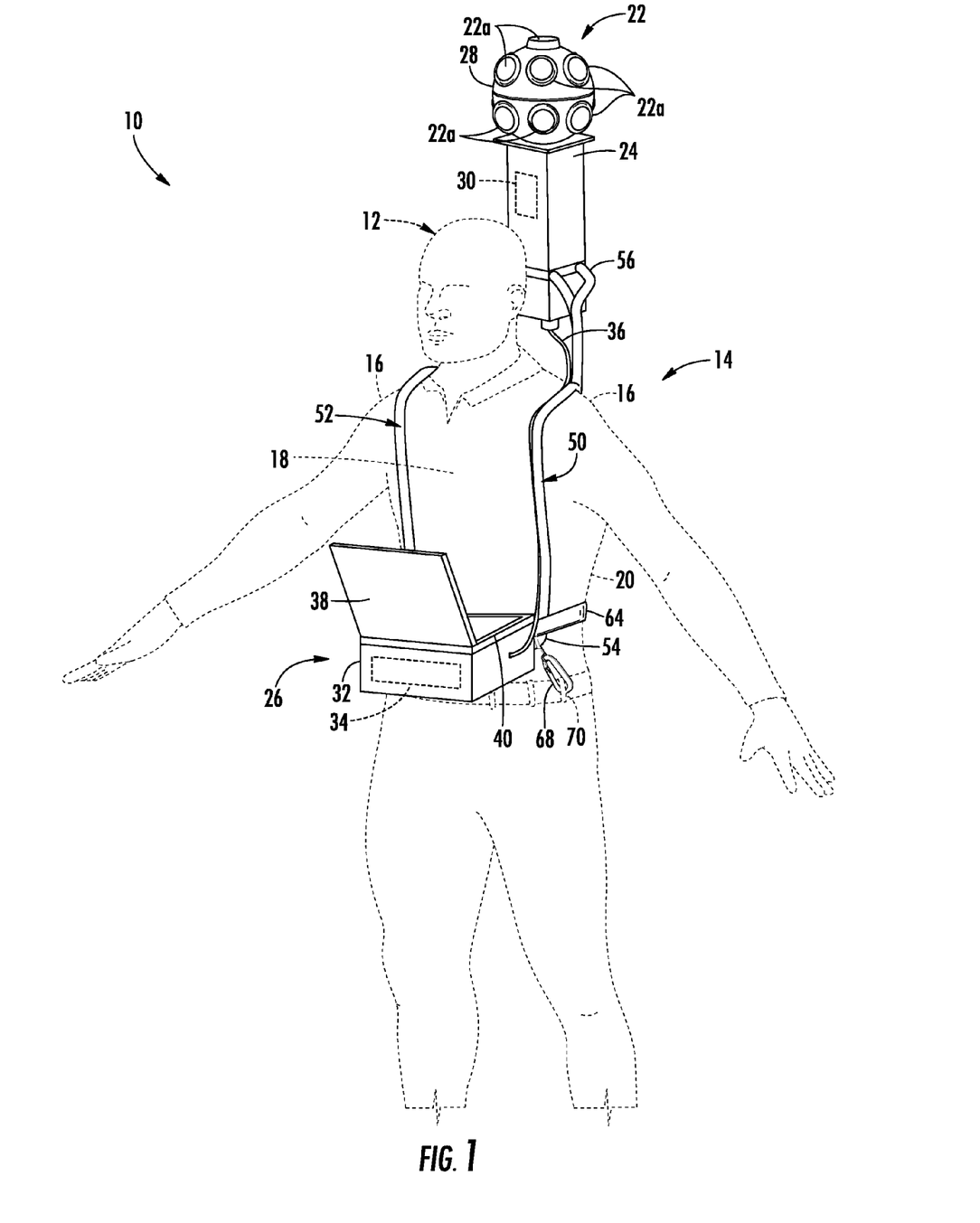
FIG. 1 illustrates a perspective view of one embodiment of a system for capturing images as a user traverses a geographic area, particularly illustrating a perspective view of a suitable frame worn by the user that may be utilized to support various types of equipment.
Figure 2:
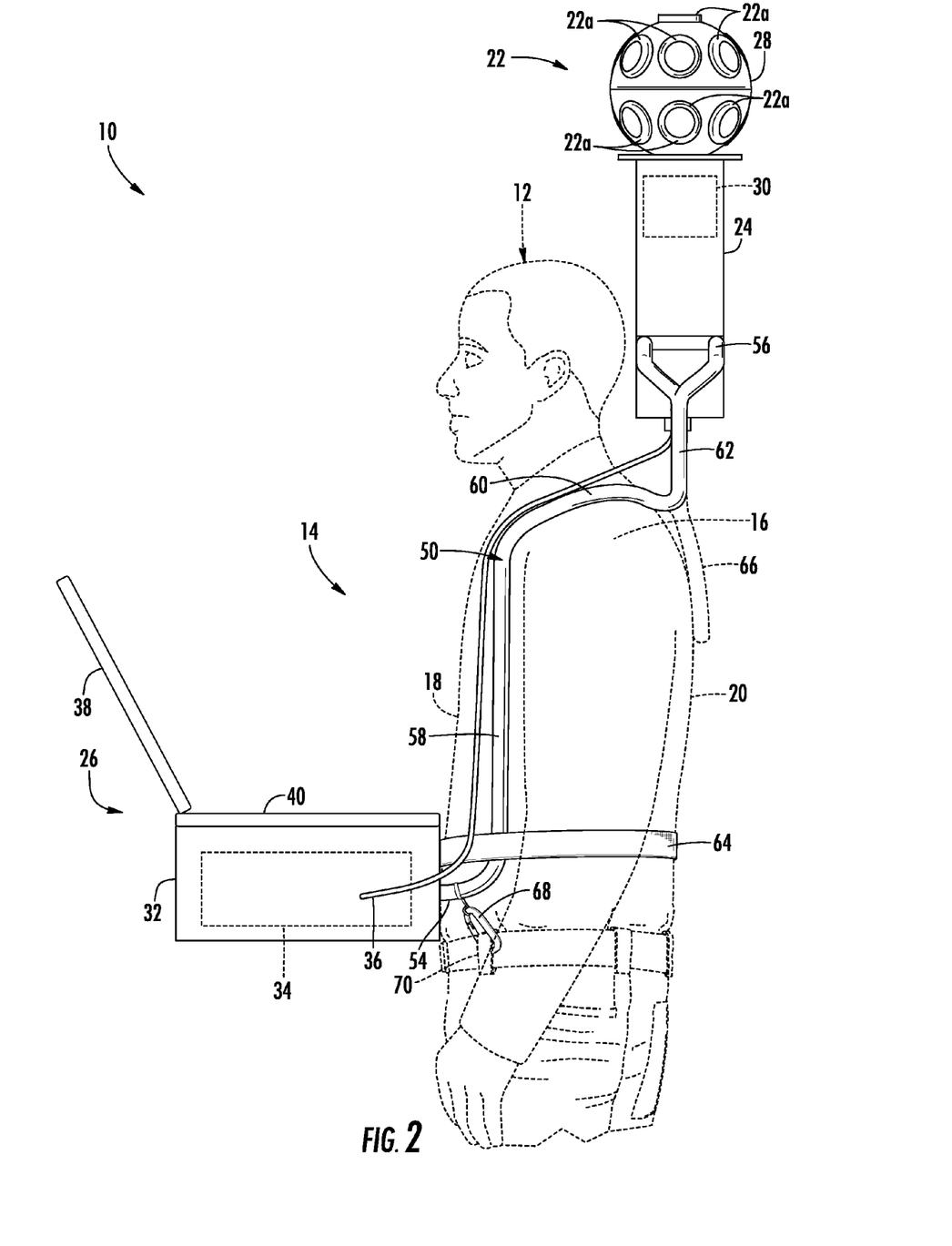
FIG. 2 illustrates a side of the system shown in FIG. 1, particularly illustrating a side view of the frame positioned on the user and the equipment supported by the frame.

Referring now to the drawings, FIGS. 1 and 2 illustrate one embodiment of a system 10 for capturing images as a user 12 is walking around or otherwise traversing a geographic area. As shown, the system 10 may include a frame 14 configured to support a plurality of equipment for capturing and/or processing images. In general, the frame 14 may have any suitable configuration that allows for the equipment to be mounted both in front of and behind the user 12. For example, as shown in the illustrated embodiment, the frame 14 may be configured to extend across the user's shoulders 16 and along at least a portion of a front side 18 and a back side 20 of the user 12. In such an embodiment, as will be described below, the amount of weight mounted to the frame 14 on either side 18, 20 of the user 14 may be carefully selected so that the magnitude of the downward force exerted on the user by the frame 14 may be centered about the user' shoulders 16, thereby assisting the user 12 in maintaining his/her balance while walking about or otherwise traversing the geographic area being imaged.

As shown in FIGS. 1 and 2, in one embodiment, a camera 22 may be mounted to the frame 14 (e.g., via a suitable support housing 24) on the back side 20 of the user 12 while a stabilizing device 26 may be mounted to the frame 14 on the front side 18 of the user 12. As used herein, the term "stabilizing device" refers to any object and/or combination of objects, mounted to the frame 14 on the opposite side of the user 12 as the camera 22, that serves as a counterweight for the camera 22 and/or any other objects supported by the frame 14 on the same side as the camera 22. For instance, in the illustrated embodiment, since the camera 22 is mounted to the frame 14 on the back side 20 of the user 12, the stabilizing device 26 may include any object(s) mounted to the frame 14 on the front side 18 of the user 12. However, in the event that the camera 22 was mounted to the frame 14 on the front side 18 of the user 12, the stabilizing device 26 may include any object(s) mounted to the frame 14 on the back side 20 of the user 12.

As indicated above, the camera 22 may generally be configured to capture images of the geographic area across which the user 12 is traveling. Thus, the camera 22 may generally be any suitable camera known in the art, such as a digital camera. In addition, it should be appreciated that, as used herein, the singular term "camera" may refer to a single camera or multiple cameras. Accordingly, in several embodiments, the camera 22 may be configured as a camera system or camera rosette including a plurality of individual cameras 22a. For example, as shown in FIGS. 1 and 2, in one embodiment, the camera 22 may be configured the same as or similar to the street view camera system used by Google to capture street-level images (e.g., the Google R5 or R7 camera rosette) and, thus, may include a spherical-shaped base 28 having a plurality of individual, outward-looking cameras 22a (e.g., eight or fifteen cameras) spaced apart around the circumference of the base 28. However, in other embodiments, the camera 22 may have any other suitable rosette configuration known in the art.

As is generally understood, camera rosettes, such as the one shown in FIGS. 1 and 2, may generally allow for a plurality of images to be captured simultaneously, thereby providing a means for generating panoramic images. For example, in the illustrated embodiment, the user 12 may walk around a given geographic area while the camera 22 continuously captures a plurality of images simultaneously. Thereafter, each set of images captured by the camera 22 at a given instance may be stitched together to form a panoramic image of the portion of the geographic area surrounding the user 12 at such instance.

Additionally, in several embodiments, a global positioning satellite (GPS) antenna 30 may also be mounted to or otherwise supported by the frame 14. For example, as shown in the illustrated embodiment, the GPS antenna 30 may be supported by the frame 14 along the back side 20 of the user 12 (e.g., by being mounted onto and/or within the housing 24 supporting the camera 22). However, in other embodiments, the GPS antenna 30 may be mounted to or otherwise supported by the frame 14 at any other suitable location. For example, in another embodiment, the GPS antenna 30 may be mounted to the frame 14 along the front side 18 of the user 12 and, thus, may form part of the stabilizing device 26 (assuming the camera 22 is mounted on the back side 20 of the user 12).

In general, the GPS antenna 30 may be configured to receive position transmissions from available satellites in order to acquire its own three dimensional coordinates. As such, the GPS antenna 30 may be used to provide information regarding the position of the user 12, which can then be linked to the images being captured by the camera 22. For example, in one embodiment, each image captured by the camera 22, as well as each position transmission received by the GPS antenna 30, may be time stamped. As such, each set of simultaneously captured images may be correlated to a given set of three-dimensional coordinates, thereby allowing the images to be mapped into a suitable geographic information system (GIS), such as Google Maps.

To enhance the image capturing function of the system 10, it should be appreciated that, in several embodiments, the stabilizing device 26 may generally be any suitable combination of electronic devices and/or other equipment configured to assist in the capturing and/or processing of the images. For instance, as shown in FIGS. 1 and 2, the stabilizing device 26 may include an equipment housing 32 mounted to the frame 14 that is configured to encase various devices/equipment 34, such as one or more computers and/or or other processing devices, hard drives and/or other storage devices, batteries, fans and/or the like. In such an embodiment, a suitable communicative cable 36 may be utilized the couple the camera 22 (and, optionally, the GPS antenna 30) to the devices/equipment 34 stored within the housing 32. Additionally, as particularly shown in FIG. 2, the stabilizing device 26 may also include a monitor 38 and associated keyboard 40 (or other suitable input feature) mounted to or otherwise supported by the housing 32. The monitor 38 may be configured to display the images being captured by the camera 22, thereby allowing the user 12 to verify the functionality of the camera 22. Similarly, the keyboard 30 may allow the user to input relevant information associated with the images, such as comments, notes and/or position information.

However, it should be appreciated that, in alternative embodiments, the stabilizing device 26 may be any other suitable object and/or combination of objects. For example, instead of being electronic devices and/or other equipment designed to assist in the capturing and/or processing of images, the stabilizing device 26 may simply be one or more weighted objects configured to serve as a counterweight to the camera 22 and/or other objects mounted to the frame 14 along the opposed side of the user 12.

As indicated above, by mounting substantially equal amounts of weight along either side of the user 12, the load applied on the user 12 by the frame/equipment may be centered on the user's shoulders 16. For example, in the illustrated embodiment, the weight of the stabilizing device 26 (e.g., the housing 32, devices/equipment 34, monitor 38, keyboard 40 and/or any other objects) may be selected based on the weight of the camera 22, GPS antenna 30 and associated housing 24 such that the load is balanced on the user's shoulders 16 (i.e., so that no moment exists about the user's shoulders 16). Accordingly, the load may be comfortably carried by the user for extended periods of time without requiring additional effort and/or energy on the part of the user in maintaining his/her balance.

Figure 3:
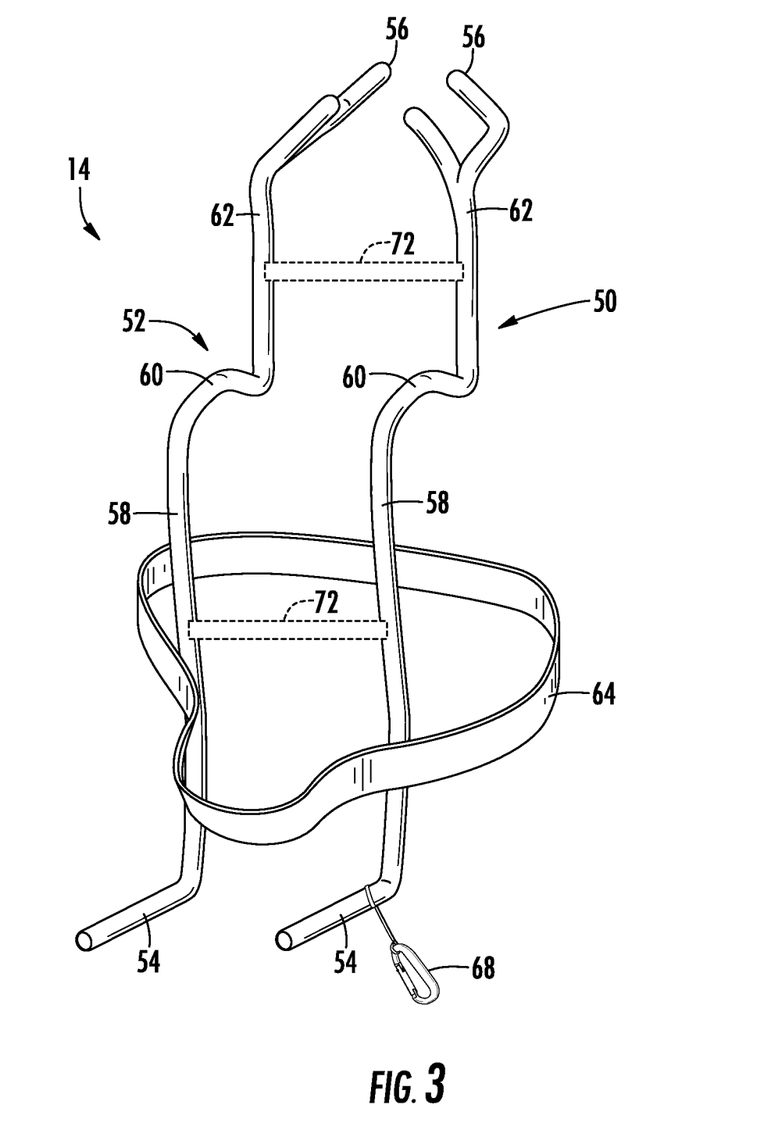
FIG. 3 illustrates a perspective view of the frame shown in FIGS. 1 and 2.

Referring generally now to FIGS. 2 and 3, various aspects of one embodiment of the frame 14 will be described. As particularly shown in FIG. 3, the frame 14 may include a first frame member 50 and a second frame member 52, with each frame member 50, 52 generally extending lengthwise between a forward end 54 and an aft end 56. In general, each frame member 50, 52 may have any suitable configuration that permits the frame members 50, 52 to function as described herein. However, in several embodiments, the frame members 50, 52 may generally define elongated or stretched out "s" or "z" shapes between their forward and aft ends 54, 56 such that each frame member 50, 52 extends along at least a portion of the front side 18 and the back side 20 of the user 12. For example, as shown in FIGS. 2 and 3, each frame member 50, 52 may generally include a front section 58, a middle section 60 and a back section 62 with the various sections 58, 60, 62 of each frame member 50, 52 extending between the forward and aft ends 54, 56 so as to be positioned along a portion of the user's front side 18 (e.g., along a portion of the user's torso), across the user's shoulders 16 and along a portion of the user's back side 20 (e.g., behind the user's head)

Specifically, in several embodiments, the front section 58 of each frame member 50, 52 may be configured to extend generally vertically or upward between the forward end 54 and the middle section 60 across a portion of the user's torso (e.g. from a location adjacent to the user's waist upwards across the user's chest). Similarly, the back section 62 of each frame member 50, 52 may be configured to extend generally vertically or upward between the middle section 60 and the aft end 56 so as to be disposed behind at least a portion of the user's head. Additionally, the middle section 60 of each frame member 50, 52 may be configured to extend generally horizontally between the front and back sections 58, 62 such that the frame 14 may be supported across the user's shoulders 16. For example, the middle section 60 of the first frame member 50 may be configured to extend across and be supported by the user's left shoulder 16 while the middle section 60 of the second frame member 52 may be configured to extend across and be supported by the user's right shoulder 16. As such, when the weight supported along each side of the user 12 is balanced as described above, the center of gravity of the frame 14 may be disposed at a location along the middle section 60 of each frame member 50, 52.

It should be appreciated that, in several embodiments, the various sections 58, 60, 62 of the frame members 50, 52 may be formed integrally with one another such that each frame member 50, 52 forms a continuous, unitary component of the frame 14. In one embodiment, each frame member 50, 52 may be configured as a single, molded component. For instance, the front, middle and back sections 58, 60, 62 of each frame member 50, 52 may be formed integrally within the same mold using a suitable moldable material (e.g., a laminate composite material, such as a carbon or glass fiber reinforced composite, a metal material and/or the like). In another embodiment, each frame member 50, 52 may be formed by shaping a continuous block of material, such as by shaping a continuous piece of wood or metal to form the various sections 58, 60, 62 of each frame member 50, 52. Alternatively, one or more of the sections 58, 60, 62 of each frame member 50, 52 may be formed as an individual component(s) and, thus, may be separately coupled to the other section(s) to form each frame member 50, 52 (e.g., by using suitable mechanical fasteners or by welding or adhering the sections together).

It should also be appreciated that the different sections 58, 60, 62 of each frame member 50, 52 may generally have any suitable configuration that allows the frame 14 to be used as described herein. For example, as shown in FIG. 2, a portion of the middle sections 60 of each frame member 50, 52 may be slightly arced or curved so as to conform to the shape of the user's shoulders 16. Additionally, the front and back sections 58, 62 may also be shaped so as to conform to the shape of the user's body. For instance, as shown in FIG. 2, at an upward portion of the front sections 58 may be slightly arced or curved such that the frame members 50, 52 conform to the shape of the user's upper torso or chest and/or to allow for a smooth, curved transition across the user's shoulders/torso at the interface between the front and middle sections 58, 60. Similarly, a lower portion of the front sections 58 (e.g., adjacent to the forward end 54) may be arced or curved to facilitate attaching the stabilizing device 26 to the front sections 58. Similarly, as shown in FIG. 2, a lower portion of the back sections 62 may be slightly arced or curved to allow for a smooth, curved transition at the interface between the middle and back sections 60, 62.

As indicated above, the frame 14 may be configured to support both the camera 22 and the stabilizing device 26 on opposed sides 18, 20 of the user 12. Thus, in several embodiments, the camera 22 may be configured to be coupled to a portion of the back sections 62 of the frame members 50. 52. Specifically, as shown in FIG. 1, the housing 24 supporting the camera 22 (and, optionally, the GPS antenna 30) may be configured to be mounted between the back sections 62. In such an embodiment, it should be appreciated that each frame member 50, 52 may generally have any suitable configuration that allows for the mounting of the housing 24 between the back sections 62. For example, as shown in FIG. 3, each back section 62 may be forked as it extends toward the aft end 56 of the frame member 50, 52 to provide two points of contact for mounting the housing 24 between the back sections 62. As such, the forked ends may be coupled to opposed sides of the housing 24 (e.g., using suitable mechanical fasteners or by welding or adhering the frame members 50, 52 to the housing 24) to allow for the camera 22 to be supported by the frame 14. However, in other embodiments, the camera 22 may generally be configured to be coupled to any other portion of the frame 14 using any suitable attachment means known in the art.

Similarly, in the illustrated embodiment, the stabilizing device 26 may be configured to be coupled to a portion of the front sections 58 of the frame members 50, 52. For instance, as shown in FIGS. 1 and 2, the housing 32 containing the various devices/equipment 34 may be coupled to the front sections 58 (e.g., by using suitable mechanical fasteners or by welding or adhering the frame members 50, 52 to the housing 32).

Figure 4:
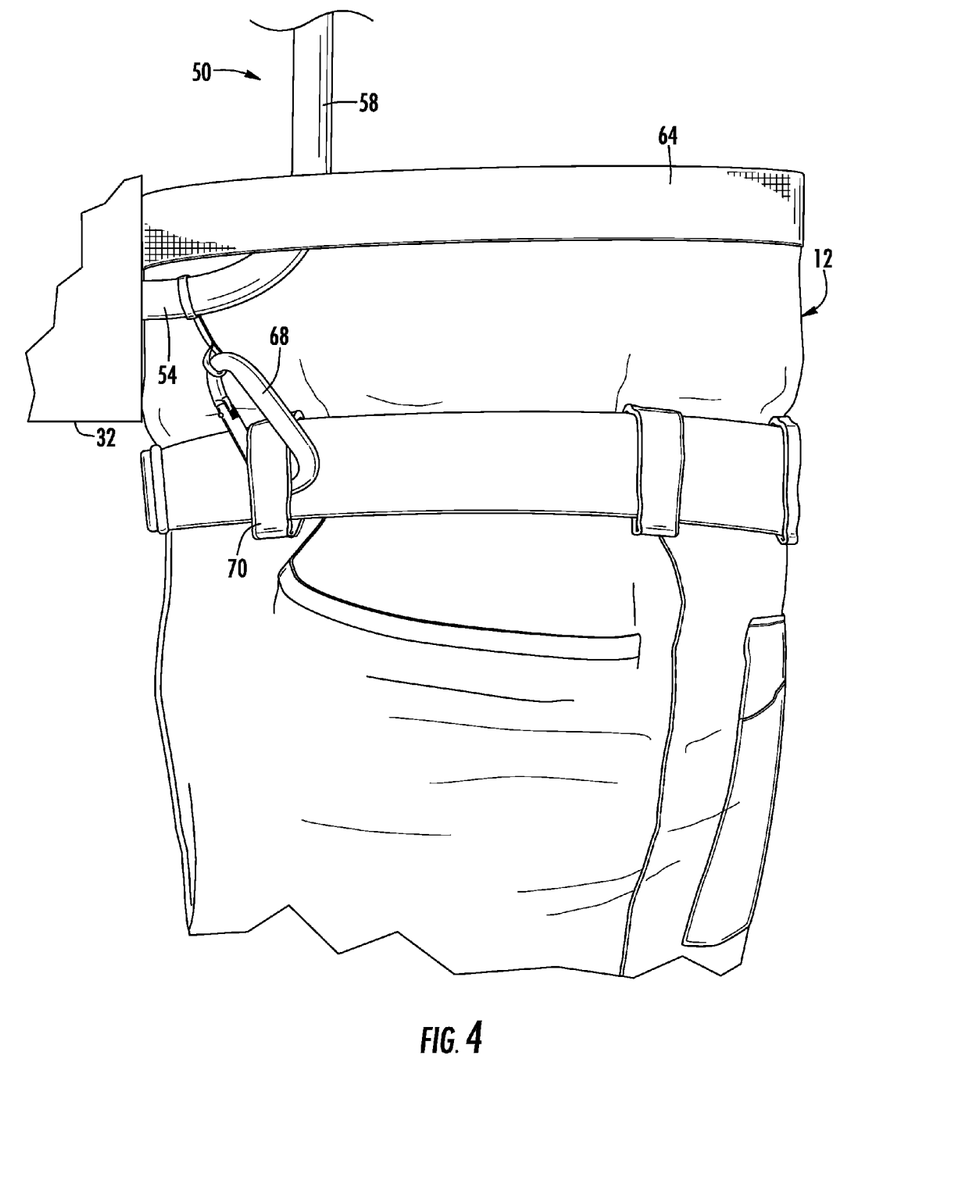
FIG. 4 illustrates a blown-up view of a portion of the system shown in FIG. 2, particularly illustrating attachment devices (e.g., clips or hooks) being used to couple the frame to a portion of the user's clothing (e.g., the user's belt loop).

It should be appreciated that, in addition to the frame members 50, 52, the disclosed frame 14 may also include suitable features and/or devices for maintaining the position of the frame 14 relative to the user 12. Specifically, in several embodiments, the frame 14 may include a strap 64 that is configured to wrap around the user's torso or waist to prevent the frame 14 from tipping forward or backwards relative to the user 12. For example, as shown in FIGS. 1 and 2, the strap 64 may be wrapped around both the user's torso and a portion of the front sections 58 of the frame members 50, 52 in order to maintain the front sections 52 positioned closely against the user's torso. Alternatively, the strap 64 may be coupled to one or both of the front sections 58 and configured to wrap around the user's torso. In addition to using the strap 64 to prevent tipping or tilting of the frame 14, or as an alternative thereto, each frame member 50, 52 may also be configured to be supported along the user's back. For example, as shown in FIG. 2, the back sections 62 of the frame members 50, 52 may each include downwardly projecting member 66 (shown in dashed lines) configured to extend along a portion of the user's back, thereby preventing the frame 14 from tipping or tilting forward. Additionally, the frame 14 may also include one or more attachment devices 68 configured to be coupled to a portion of the user's clothing. For example, as particularly shown in FIG. 4, in one embodiment, a pair of hooks or clips 68 may be coupled to the front sections 58 of the frame members 50, 52 and may be configured to be hooked or clipped onto the user's pants (e.g., a belt loop 70) to prevent the frame 14 from moving up or down relative to the user 12. However, in other embodiments, the frame 14 may include any other suitable features and/or attachment devices configured to maintain the position of the frame 14 relative to the user 12.

Moreover, the frame 14 may also include one or more features configured to support the frame members 50, 52 relative to one another. For example, as shown in FIG. 3, one or more cross-brace members 72 (shown in the dashed lines) may be coupled between portions of the frame members 50, 52, such as by coupling the cross-brace members 72 between the back sections 62 and/or the front sections 58 of the frame members 50, 52.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A system for capturing images while a user is traversing a geographic area, the system comprising:
    a camera configured to capture at least one image of the geographic area; and
    a frame configured to support the camera, the frame comprising:
        a first frame member extending lengthwise between a forward end and an aft end, the first frame member including a front section extending generally upward from the forward end, a middle section extending generally horizontally from the front section and a back section extending generally upward from the middle section towards the aft end; and
        a second frame member extending lengthwise between a forward end and an aft end, the second frame member including a front section extending generally upward from the forward end, a middle section extending generally horizontally from the front section and a back section extending generally upward from the middle section towards the aft end; and
    wherein the camera is coupled to a portion of one of the front sections of the first and second frame members or the back sections of the first and second frame members.

2. The system of claim 1, further comprising a stabilizing device coupled between a portion of the other of the front sections of the first and second frame members or the back sections of the first and second frame members, the stabilizing device being configured to counterbalance an amount of weight supported by the frame on the opposed side of the frame such that the frame is balanced about the middle sections of the first and second frame members.

3. The system of claim 2, wherein a weight of the stabilizing device is substantially equal to the amount of weight supported by the frame on the opposed side of the user.

4. The system of claim 2, wherein the stabilizing device comprises at least one piece of equipment or device configured to assist in the capturing or processing of the images captured by the camera.

5. The system of claim 1, wherein the middle section of the first frame member is configured to extend generally horizontally across a first shoulder of the user and the middle section of the second frame member is configured to extend generally horizontally across a second shoulder of the user.

6. The system of claim 1, wherein the front sections of the first and second frame members are configured to extend from the middle sections along at least a portion of a torso of the user.

7. The system of claim 1, further comprising a strap coupled to or extending around at least one of the front section of the first member or the front section of the second member, the strap being configured to wrap around the torso of the user.

8. The system of claim 1, wherein the back sections of the first and second frame members are configured to extend from the middle sections to a position behind a head of the user.

9. The system of claim 1, wherein the camera is supported by a housing, the housing being coupled between the back section of the first frame member and the back section of the second frame member.

10. The system of claim 1, further comprising at least one attachment device connected to the frame, the at least one attachment device being configured to be coupled to an article of clothing worn by the user.

11. The system of claim 1, wherein the camera is configured to capture a plurality of simultaneous images of the geographic area.

12. The system of claim 1, further comprising a UPS antenna mounted to the frame, the UPS antenna being configured to provide position information related to the geographic area.

13. The system of claim 2, wherein at least a portion of the stabilizing device is coupled to at least one of the front section of the first frame member or the front section of the second frame member.

* * * * *

UNITED STATES PATENT AND TRADEMARK OFFICE
CERTIFICATE OF CORRECTION

| | |
|---|---|
| PATENT NO. | : 8,941,777 B1 |
| APPLICATION NO. | : 13/664508 |
| DATED | : January 27, 2015 |
| INVENTOR(S) | : Ratner |

It is certified that error appears in the above-identified patent and that said Letters Patent is hereby corrected as shown below:

Claims

Column 9, Line 8, Claim 12, after word "a", please delete "UPS" and insert --GPS--.

Column 9, Line 9, Claim 12, after word "the", please delete "UPS" and insert --GPS--.

Signed and Sealed this
Sixteenth Day of August, 2016

Michelle K. Lee
*Director of the United States Patent and Trademark Office*